Dec. 10, 1968  E. H. EVALDS  3,416,060
THERMALLY RESPONSIVE CONTROL CIRCUIT WITH AUTOMATIC RESET
Filed Oct. 23, 1965  3 Sheets-Sheet 1

EGILS H. EVALDS  INVENTOR

BY *Robert L. Marken*
ATTORNEY

EGILS H. EVALDS INVENTOR.

ATTORNEY

United States Patent Office

3,416,060
Patented Dec. 10, 1968

3,416,060
THERMALLY RESPONSIVE CONTROL CIRCUIT WITH AUTOMATIC RESET
Egils H. Evalds, Ardmore, Pa., assignor to Robertshaw Controls Company, Richmond, Va., a corporation of Delaware
Filed Oct. 23, 1965, Ser. No. 503,996
25 Claims. (Cl. 318—473)

ABSTRACT OF THE DISCLOSURE

An alternating current bridge circuit output signal which varies in accordance with a temperature responsive resistance directly controls the operation of a SCR. The SCR controls the operation of a relay which in turn operates to connect and remove resistance from the bridge circuit to determine the set point and reset point temperatures for the bridge circuit. The resistance change introduced is selected to place the reset point temperature within the range of temperature the bridge circuit will sense to provide automatic resetting of the bridge circuit.

---

The invention presented herein relates generally to thermally responsive control systems, and, more particularly, to such a system which is especially useful in providing thermal protection of electric motors.

Many electric motors are protected against overheating by thermal relays which respond either to the heat generated in the motor windings or by a current carrying heater in the relay. While thermal relays of this general type provide adequate protection when the rate of temperature rise encountered in the motor is relatively low, the thermal lag inherent in thermal relays of this type drastically limits the area of application for such thermal relays. Thus, such relays cannot begin to provide adequate response for use in a protection circuit for motors where the rate of temperature rise encountered in the windings can run as high as 50° F. per second. This is the case for electric motors presently being manufactured for use in compressors for refrigeration or air-conditioning equipment. When used in such equipment the motors may be subjected to stalled rotor conditions or to overload conditions causing the temperature of the motor windings to increase very rapidly to dangerous levels.

Thus, an overload protective system must be capable of responding rapidly to actual temperatures within the motor if it is to have a wide range of application. In addition, such protective systems should be "fail safe," i.e., the motor should be deenergized if certain defects occur in the protective system. Further, since conditions giving rise to abnormal motor temperatures are sometimes self-correcting, as is the case in refrigeration systems, it is desirable that an adequate time delay be provided following the sensing of an unsafe temperature to prevent the motor from being operated prematurely, i.e., prior to the normal time needed for self-correction of the system in which the motor is used. Such a time delay is needed in cases where the protective system automatically resets itself.

Further, since overload protection circuits are used to terminate any additional thermal input to the motor windings when the windings reach a predetermined temperature, the amount of temperature overshoot due to thermal lag will be directly proportional to the rate of temperature rise of the windings. Thus, when the temperature rise is very gradual the signal developed for initiating the termination of thermal input will not increase very much beyond that needed for such initiation since the temperature overshoot will be small tending to cause the system to cycle at the set point temperature for the system. The time delay referred to above will serve to correct this problem as well as providing time for any self-correcting action to take place prior to the system being reset.

Accordingly, it is an object of the invention presented herein to provide a temperature responsive electrical control system which responds rapidly to temperature changes.

Another object is to provide a temperature responsive control system which provides "fail safe" operation.

A further object is to provide a thermally responsive control system which provides delayed automatic reset.

Still another object is to provide a thermally responsive control system having delayed automatic reset in which the reset feature is incorporated into the basic system without influencing the operation of the system when it is conditioned to sense the set point temperature for the system.

An additional object is to provide a thermally responsive control system which is voltage compensated and thus operable from an unregulated power source.

Another object is to provide a thermally responsive control system having delayed automatic reset provided in such a manner that when the reset point is reached the reset action is amplified thus providing a positive-type resetting action.

These and other objects of the invention presented herein are attained with circuitry including a phase sensitive switch circuit means having an input. The switch circuit means has a first and second mode of operation which is determined by phase and magnitude of a signal applied to its input. The switch circuit means is connected to a first bridge circuit in response to its first mode of operation and is connected to a second bridge circuit in response to its second mode of operation. The first and second bridge circuits include a temperature responsive resistive sensor which is common to the bridge circuits. Upon sensing a first temperature the sensor causes the output signal of the first bridge circuit to be such as to cause the switch means to change to its second mode of operation and therefore connect the second bridge circuit to the switch means. The switch circuit means then remains in its second mode of operation until the sensor responds to a second temperature which causes the output of the second bridge circuit to revert back to its first mode of operation and again connect the first bridge circuit to the switch circuit means.

In the case of the use of such an arrangement for protecting a motor from excessive temperatures, the sensor is embedded in the motor windings and the first mode of operation of the switch circuit means corresponds to the circuitry used for sensing an abnormal or unsafe temperature level. The switch circuit means in addition to controlling the bridge circuit to which it is connected also controls the current input to the motor in response to its first and second modes of operation. Thus, when the first or unsafe temperature is sensed the first bridge circuit presents an output to the switch circuit means causing its mode of operation to change and effect termination of current flow to the motor and connect the second bridge circuit to the switch circuit means. The second temperature is that temperature to which the motor windings must drop before the second bridge circuit has an output signal necessary to cause the switch circuit means to return to its first mode of operation to again allow current flow to the motor and connect the first bridge circuit to the switch means. The difference between the first and second temperature is thus a measure of the time delay introduced into the system between detection of an unsafe temperature and the time it is reset for again detecting an unsafe temperature level.

The preferred embodiment of this invention, comprising a bridge network having two four-leg bridge circuits adapted for energization from an alternating current source, provides one way of attaining these and other objects. A transformer with a tapped secondary winding is used. The secondary winding provides the alternating current input for the bridge network and also serves to provide two of the bridge legs for each of the two bridge circuits in the bridge network. The remaining two bridge legs for one of the bridge circuits are connected in series across the secondary winding of the transformer. One of said remaining two bridge legs includes a temperature responsive resistance element which is positioned at the temperature monitoring point. The other of said remaining legs is also resistive. A phase sensitive electronic switch circuit means including a phase sensitive electronic switch device such as a thyristor, i.e., a semiconductor device having control characteristics similar to those of thyratron tubes, or a circuit equivalent thereto, is connected for control by output voltage of the bridge, i.e., the voltage present between the tapped connection on the secondary winding and a point intermediate the two legs connected across the secondary winding. This voltage varies with the resistance presented by the temperature responsive resistance element.

The electronic switch circuit means also includes an electric translating device such as an electric relay which is energized or deenergized dependent upon the mode of operation of the phase sensitive electronic switch and is connected to the secondary winding of the transformer. The electronic switch circuit means conducts when the temperature responsive resistance element is sensing below the desired set point temperature as determined by the elements in the bridge circuit. Thus, the circuit will "fail safe" should the phase sensitive electronic switch device or electric relay fail since the electronic switch circuit means will then have an output corresponding to its operating condition when the desired set point temperature has been reached. It is also desirable that the circuit provide a "fail safe" condition should the temperature responsive resistance element present an open circuit. This is accomplished by using a temperature responsive resistance element having a positive coefficient of resistance. Thus, an open circuit in the leg in which the temperature responsive resistance element is located causes the bridge circuitry to provide a control voltage for the electronic switch circuit means which is indicative of the set point temperature being reached or exceeded.

Briefly, the above described circuitry provides a control system in which the phase sensitive electronic switch device is turned "on" to energize the electric relay when the temperature sensitive resistance is responding to temperature which is below the set point temperature for the system as determined by the bridge circuit connected to the phase sensitive switch means when in the "on" mode. The bridge circuit connected is then presenting a voltage which is of the phase and magnitude needed to cause the phase sensitive electronic switch device to conduct for at least a portion of each cycle of the alternating voltage applied to the bridge circuit. As the temperature to which the temperature sensitive resistance is responding increases, the magnitude of the bridge output voltage decreases to zero and then increases in magnitude but is of the opposite phase. A temperature is reached at which point the phase sensitive electronic switch device is turned "off." This temperature is referred to as the set point temperature. The phase sensitive electronic switch device remains "off" for any temperature above the set point temperature. In the case of a silicon controlled rectifier used as the phase sensitive electronic switch device, it is necessary that the bridge output voltage be approximately .6 v. or greater at 25° C. and provide a voltage at the input to the silicon controlled rectifier which is of the same polarity as the voltage signal appearing at the anode of the silicon controlled rectifier in order for the silicon controlled rectifier to conduct.

The circuit as described automatically resets itself when the temperature being sensed drops below the set point temperature. As indicated, there are cases when this reset action occurs too quickly. A delayed automatic reset action is provided by the second bridge circuit in the bridge network. The second bridge circuit is connected to the phase sensitive switch means via switch contacts operated by the electric relay controlled by the phase sensitive electronic switch device. The second bridge circuit thus replaces the first bridge circuit and is connected to the phase sensitive switch means as soon as the electric relay is deenergized. The second bridge circuit presents an output voltage which keeps the switch device in the "off" mode until the temperature sensed decreases to the set point temperature of the second bridge circuit which is well below the set point temperature of the first bridge circuit. The set point temperature of the second bridge circuit is referred to as the reset point of the system. The output voltage of the second bridge circuit when the reset point temperature is sensed is effective to turn "on" the phase sensitive electronic switch device to again energize the electric relay. The time required for the temperature to reach this reset point provides desired delay prior to reset. Upon operation of the electric relay caused by this reset action, the circuity change initiated by the deenergized relay is terminated causing the first bridge circuit to again be connected to the phase sensitive switch means until the set point temperature of the system is again reached.

The second bridge circuit in the bridge network is most readily obtained by using the relay contacts to connect an additional resistance in series and/or parallel arrangement with one of the two bridge legs of the first bridge circuit which are connected across the secondary winding. The additional resistance is then connected in circuit or removed therefrom to provide the action described earlier. A series arrangement is the most desirable since it simplifies the calculations needed to provide a desired reset point. Thus, a resistance can be connected in series with one of the legs and shorted out as needed via a short circuit branch which includes a set of contacts operated by the electric relay to provide the desired change at the bridge circuit output. More specifically, if the circuit modifying resistance is connected in series with a temperature sensitive resistance which has a positive coefficient of resistance, the short circuit branch is connected by contacts operated to the closed position by the energized electric relays to by-pass the circuit modifying resistance and thus place the first bridge circuit in operation for sensing the set point temperature. Upon sensing the set point temperature the electric relay will be deenergized causing the contacts connected in the short circuit branch to open. The circuit modifying resistance thus adds to the resistance presented by the temperature sensitive resistance causing the second bridge circuit to be placed in operation which provides a reset point for the system which is below the set point temperature for the system as determined by the first bridge circuit. The amount of resistance so added by the second bridge circuit determines the reset point. The greater the amount of resistance added the lower the reset temperature. When the system is reset the electric relay is energized to close the contacts in the short circuit branch thus shorting out the circuit modifying resistance and therefore removing the second bridge circuit and connecting the first bridge circuit to the phase sensitive switch means.

This circuitry in addition to providing delayed automatic reset action also prevents relay chatter since it serves to amplify the reset action. Relay chatter during the reset action or energization of the electric relay becomes a problem when the control circuit is used to protect a large load. The electric relay normally operates contacts for controlling the flow of current to the load circuit being protected. When these control contacts close upon energization of the electric relay the load is connected to the supply voltage causing it to drop momentarily. This drop in supply voltage causes the control circuit to be turned off and on very rapidly bringing about the relay chatter. However, in the circuit having the delayed reset action such a problem is not present since the reset action is effective to change the bridge circuitry so that a large change in the input signal applied to the phase sensitive electronic switch is produced at the time the switch is turned "on" at the reset temperature.

Voltage compensation is to some degree inherent in the circuit being used since the phase sensitive electronic switch is controlled by a bridge circuit. However, because the sensor is resistive in nature voltage variations can present a problem due to any self heating of the sensor. This problem is corrected by proper selection of the resistance values and is further minimized by using a phase sensitive electronic switch device which requires a low level signal to control its operation.

A thorough understanding of the invention and details of the manner in which these and other objects are attained in accordance with the invention may be obtained by reference to the remaining portion of specification and the following drawings which form a part thereof, and wherein.

Figure 1:
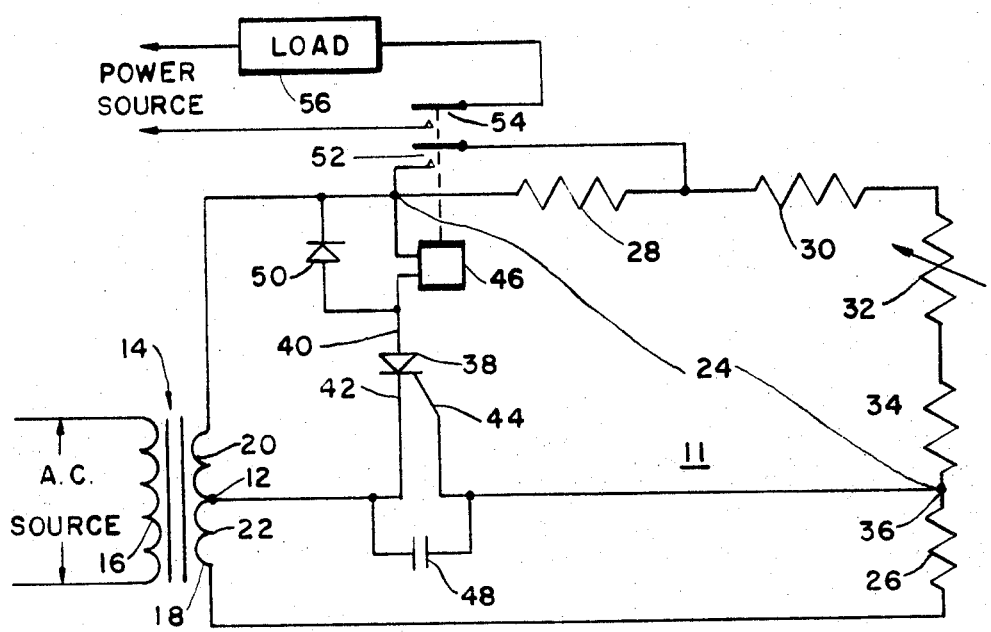
FIG. 1 is a circuit embodying the invention presented herein.

FIG. 1 shows a four-leg alternating current bridge circuit network 10 connected to control a phase sensitive switch means 11. The network 10 includes two bridge circuits which are selectively connected in response to the mode of operation of the phase sensitive switch means 11 to provide the input signal for said switch means 11. The network 10 includes a transformer 14 having its primary winding 16 connected to an alternating current source and its secondary winding 18 formed with a tapped connection 12 allowing the winding 18 to be connected to function as part of the bridge circuit network 10. The transformer 14 is a step-down type. A transformer developing 24 volts across the secondary winding is used to provide a voltage suitable for operating the phase sensitive switch means 11 utilizing semiconductor switch devices. The portions of the secondary winding above and below the tapped connection 12 are used as legs 20 and 22 of both bridge circuits in the bridge circuit network 10. Two legs or branches 24 and 26 are connected in series and the combination connected across the secondary winding 18 to complete the bridge circuits of bridge network 10. These legs are formed from resistive elements. Thus, branch 24, as shown in FIG. 1, is connected to leg portion 20 of secondary winding 18 and includes resistance elements 28, 30, 32 and 34 connected in series and connected as shown form leg or branch 24 for the second bridge circuit. The first bridge circuit is formed when resistance element 28 is shorted out as will be explained. Resistance element 32 is shown as variable since it is temperature responsive and is used as the temperature sensor for the bridge. Resistive branch 26 is formed from a single resistance element and is connected to branch 24 at one end and at the other end to the leg portion 22 of secondary winding 18.

Figure 2:
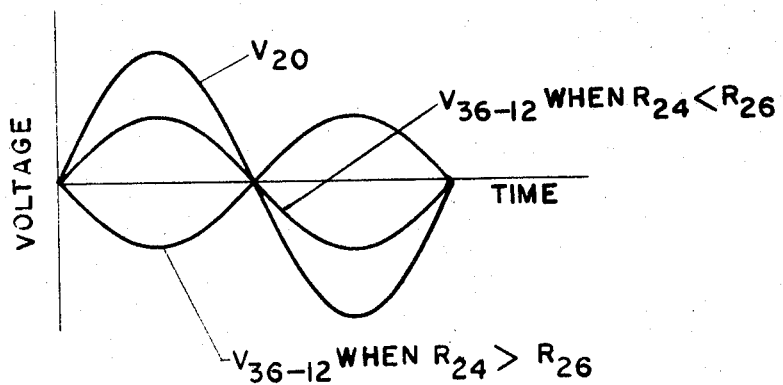
FIG. 2 is a showing of the voltage relationships existing in the circuit of FIG. 1 under various conditions.

The output of the bridge circuit network 10 appears between the tapped connection 12 and the connection 36 which is common to the branches or legs 24 and 26. Since only the temperature responsive resistance element 32 of the bridge circuit network 10 is variable, it is apparent that the output voltage appearing between points 12 and 36 will vary in magnitude and phase with changes in the resistance presented by element 32. For purposes of illustration, this variation in magnitude and phase and other aspects regarding the operation of the circuit will be explained by considering the tap connection 12 to be at the electrical center of the secondary winding 18. If leg 24 then presents the same resistance as leg 26 the output voltage for the bridge, i.e., the voltage between connections 12 and 36, will be zero. When leg 24 presents less resistance than leg 26, a voltage difference will appear between connections 12 and 36 which when measured at connection 36 with respect to connection 12 is in phase with the voltage measured between the upper end of secondary winding 18 and connection 12. This is readily understood if the extreme case is considered, i.e., assume the resistance of leg 24 is zero. In such a case the connection 36 will be electrically the same as the upper end of secondary winding 18 and will therefore be in phase with and have the same amplitude as the voltage appearing across the upper half of the secondary winding 18 or leg 20. The maximum amplitude of the alternating voltage appearing between connections 36 and 12 will decrease as resistance is introduced between the upper end of winding 18 and connection 36. Similarly, when leg 24 presents a resistance which is greater than leg 26, the voltage at connection 36 as measured with respect to connection 12 is in phase with the voltage measured at the lower end of secondary winding 18 with respect to connection 12 and therefore 180° out of phase with the voltage measured between the upper end of secondary winding 18 and connection 12. And as before, the maximum amplitude of the alternating voltage appearing between connections 36 and 12 will vary directly with the amount of such unbalance present between the resistance in leg 24 and the resistance in leg 26. Examples of some of the voltage relationships mentioned are illustrated in FIGURE 2.

It would not be possible to use only the magnitude of the output voltage of the bridge network 10 as an indication of when the set point temperature is reached since a voltage of a given magnitude can be obtained when the resistance of leg 24 is greater than the resistance of leg 26 and when it is less than the resistance of leg 26. In order that the circuit can be used to initiate a corrective action, as in the case of its use in a motor protector circuit, it is necessary that this ambiguity be resolved. It is therefore necessary that the circuit 11 which is to respond to the bridge output require an input signal which is above a certain level and of a certain phase or polarity with relation to some reference voltage, i.e., the device or circuit responding to the bridge output must be phase sensitive.

In addition, since use of the circuit as a motor protector requires that the corrective action be taken very rapidly, it is desirable that the circuit 11 responding to the bridge output not only be phase sensitive, but provide an "on-off" or switching action as opposed to a circuitry which would provide a proportional output. A single transistor controlled in response to the bridge output would not be very satisfactory since it would provide an output proportional to the degree of bridge unbalance. A phase sensitive electronic switch device, such as a thyristor, i.e., a semiconductor device having control characteristics similar to those of thyratron tubes, or a circuit equivalent thereto, is used to control an electric translating device such as a relay to provide a phase sensitive switch means 11 responsive to the bridge network 10 output with the desired "on and off" mode of operation.

A silicon controlled rectifier (SCR) is one phase sensitive electronic switch that has been found to be satisfactory. A silicon controlled rectifier (SCR), as illustrated by SCR 38 in FIGURE 1, has three electrodes, an anode, cathode and gate, which are identified by numerals 40, 42 and 44, respectively. A silicon controlled rectifier (SCR) is a semiconductor device which, as the name indicates, conducts current primarily in one direction. However, unlike the conventional rectifier the SCR will not present a low internal resistance to current flow in the forward direction unless the anode voltage exceeds a certain minimum voltage called the forward breakdown voltage.

FIGURE 1 shows an SCR 38 connected to respond to the bridge network 10 output with the output of the SCR 38 connected to an electric translating device, such as electric relay 46. More specifically, the SCR 38 is connected with anode 40 electrically connected to the upper end of the secondary winding 18 via the winding electric relay 46. Cathode 42 is connected to the tapped connection 12 and gate 44 is connected to the output terminal 36 of the bridge network 10. Since the transformer 14 provides 24 volts A.C. across the secondary winding 18, 12 volts A.C. are applied between the anode 40 and the cathode 42. The 12 volts alone will not cause the SCR 38 to conduct in the forward direction. This voltage applied to the anode 40, however, exceeds the minimum forward breakdown voltage if the gate 44 has a voltage applied to it which is positive with respect to the cathode 42 and is applied at the same time that the forward voltage is present at the anode 40. The nominal gate voltage required is .6 v. at 25° C. and decreases slightly at a substantially uniform linear rate with an increase in temperature. When the forward breakdown voltage required is thus modified by such a gate signal, the high internal resistance of the device changes to a very low value to permit a high current to flow through the device. Once the SCR is triggered by the gate signal to the "on" mode the current flow is independent of gate voltage or current and the SCR remains in the high conduction "on" mode until the anode current is reduced to a level below that required to sustain conduction. The SCR is thus phase sensitive since the anode-cathode voltage and gate-cathode voltage must be of the same polarity to place the SCR in the "on" mode.

Referring to FIGURE 2, the voltage presented between the anode 40 and cathode 42 of SCR 38 is represented by the sine wave identified as $V_{20}$. The voltage presented between the gate 44 and cathode 42 is represented by the sine wave $V_{36-12}$ which is in phase with $V_{20}$. This in-phase relationship exists so long as the resistance in leg 24 is less than the resistance in leg 26. The amplitude of the gate to cathode voltage decreases, of course, as the resistance in leg 24 increases and reaches zero when the resistance in leg 24 equals the resistance in leg 26. When the anode to cathode and gate to cathode voltages are in phase the SCR is placed in the "on" mode for at least a portion of each positive half-cycle. During the negative half-cycle only a slight current flows through the SCR. As previously mentioned, the gate voltage, however, must be at least .6 v. (at 25° C.) to have the SCR turned "on." Therefore, when the temperature sensitive resistance 32 increases to the point where the amplitude of the gate to cathode voltage drops below .6 v. the SCR switches to the "off" mode until the gate to cathode voltage again reaches .6 v. and is in phase with the anode to cathode voltage. The temperature sensed by the sensor 32 at which the gate to cathode voltage drops below .6 v. is the set point temperature for the circuit. The temperature sensed will generally increase beyond the set point temperature. The phase sensitive switch means 11 which has its mode of operation changed when the set point temperature is reached is used to terminate the thermal input causing the temperature rise. Temperature sensed will then drop. As the temperature sensed by sensor 32 drops the decrease in the resistance presented by sensor 32 alters the bridge network 10 output so the gate to cathode voltage will again be in phase with the anode to cathode voltage and increase in magnitude to approximately .6 v. causing the SCR 38 to be returned to the "on" mode. The temperature at which the gate to cathode voltage reaches the turn "on" point for the SCR 38 as the temperature sensed decreases is referred to as the reset temperature for the circuit.

A capacitor 48 is connected between the gate 44 and the cathode 42. This serves as a low impedance path for any high voltage pulses that may appear in the A.C. voltage applied to the bridge and thus prevents the SCR 38 from being damaged by such pulses.

Also, since the SCR 38 can conduct for only a portion of a half cycle, the operation of the electric relay 46 is improved by connecting the diode 50 in parallel with the winding of the relay. The impedance presented by the relay is inductive and therefore tends to keep the current flowing. This inductive characteristics is utilized by connecting the diode so the current flow through the inductance will continue in the same direction beyond the point when the SCR is turned "off." With this arrangement relay 46 will not drop out during the "off" portion of each cycle.

The set point temperature and reset temperature are substantially the same for a single bridge circuit connected as described to control the operation of the SCR 38. Thus, the delay between the time the SCR 38 is turned "off" and when it is turned "on" is determined by the amount of lag involved in terminating the temperature rise once the circuit has responded to the set point temperature and the time it then takes for the temperature to drop to the reset temperature. This time delay prior to reset is too short for a number of applications of the circuit. Thus, a single bridge circuit could not be used to provide protection to the motor windings for a refrigerator compressor since a longer time delay before reset is desirable. If sufficient time delay is provided before the circuit is reset, the condition in the refrigerator system causing the overload on the motor will usually be corrected and a number of false starts eliminated.

A delayed reset action is obtained by further change in the gate to cathode voltage presented to the SCR 38 when it is placed in the "off" mode due to the set point temperature being reached. This change in voltage is best made at the time the phase sensitive switch means switches to the "off" mode of operation and in response to such change of mode of operation. By doing this, the circuit will not reset itself until the temperature sensor 32 is responding to a temperature well below the set point temperature. The amount of delay desired is determined by increment of change made in the gate to cathode voltage at the time the set point temperature was sensed.

The most simple and inexpensive way of accomplishing a change in the gate to cathode voltage to lower the reset point is to connect a different or second bridge circuit to control the operation of the SCR 38 and realy 46 at the time the desired set point temperature is detected. The electric relay 46 is shown controlling two sets of switch contacts 52 and 54 which are open when the relay 46 is deenergized. One of the contacts of set 52 is connected to one end of resistance 28 and the other contact of set 52 is connected to the other end of resistance 28. Thus, when the circuit is in condition to sense the set point temperature the SCR 38 is in the "on" mode so the relay 46 is energized closing contacts 52. Resistance 28 is therefore shorted out, providing a first bridge circuit comprising the secondary winding of transformer 14, leg 26 and leg 24 less resistance 28 to control the SCR 38 and relay 46. When the set point temperature is reached, the SCR 38 is changed to the "off" mode causing the relay 46 to be deenergized. Contacts 52 open and the bridge circuit then has resistance 28 added to the leg 24 to establish a second bridge circuit for control of SCR 38 and relay 46. Since this adds to the resistance increase introduced by the sensor 32 as it responded to the increasing temperature, the output voltage of the bridge circuit network 10 is changed in the direction corresponding to an increase in sensed temperature. The magnitude incremental or step reduction in the output voltage is, of course, determined by the value of resistance 28. Before the second bridge circuit of bridge circuit network 10 will provide an output voltage of the proper phase and magnitude to cause the SCR 38 to return to the "on" mode, it is necessary that the sensor 32 respond to a temperature which is well below the set point temperature which was determined by the first bridge circuit. The time it takes the temperature to drop to this established reset temperature provides the desired delay before reset. It will be apparent to those skilled in the art that a bridge circuitry modifying resistance can be selectively connected in series in leg 26 rather than in leg 24 in response to the mode of operation of the phase sensitive switch means 11 to provide the two bridge circuits needed for the desired time delay. In such a case, however, the desired drop in the bridge output voltage is obtained by shorting out the circuit modifying resistance in response to the SCR 38 being placed in the "off" mode. This is accomplished by using a relay 46 having a set of contacts which are open when the relay is energized and are closed when the relay is deenergized. The contacts are connected in series in a conductor connected in parallel with the circuit modifying resistance placed in series with leg 26. The circuit modifying resistance is thus a part of a first bridge circuit of the bridge circuit network 10 when the SCR 38 is in the "on" mode and is shorted out and therefore effectively removed from the bridge circuit network 10 when the SCR 38 was placed in the "off" mode to provide a second bridge circuit. As before the first bridge circuit determines the set point and the second bridge circuit the reset point for the system.

The set of contacts 54 controlled by relay 46 are shown connected in series with a load 56. Thus, current is supplied to the load 56 so long as the temperature sensitive resistance 32 is responding to a temperature which is below the desired set point temperature. With this condition existing the SCR 38 is in the "on" mode causing relay 46 to be energized and thus closing contacts 54. Contacts 52 are also closed causing resistance 28 to be shorted out and conditioning the circuit so the SCR 38 will remain in the "on" mode until the set point temperature is sensed at the sensor 32. Upon sensing the set point temperature, the SCR 38 is placed in the "off" mode causing relay 46 to be deenergized. Contacts 54 open to disconnect the load 56 from its power source. Contacts 52 also open placing resistance 28 in leg 24. This changes the output voltage of the bridge circuit network 10 as has been described making it necessary for the sensor 32 to respond to a temperature that is well below the set point temperature in order to place the SCR 38 in the "on" mode and thus have the load 56 connected to its source of power via the relay contacts 54. A delayed reset action is thus provided to prevent premature energization of the circuit for load 56.

As has been mentioned, the gate to cathode voltage needed to fire an SCR is about .6 v. at 25° C. and decreases at a substantially linear rate with an increase in the temperature of the SCR. If the circuit did not provide compensation for this change in the gate voltage, the set point temperature would rise with an increase in SCR ambient temperature, i.e., the resistance increase in the sensor 32 needed to place the SCR in the "off" mode would increase as the SCR ambient temperature increased. By providing an incremental increase in the resistance in leg 24 as determined by the ambient temperature for SCR 38, it is possible to compensate for this change in the set point. The resistance 30 is added to leg 24 to provide this compensation and is positioned to respond to the ambient temperature of the SCR 38. It is made from the same wire as sensor 32 and therefore provides an increase in resistance with an increase in temperature at the SCR 38.

Figure 3:
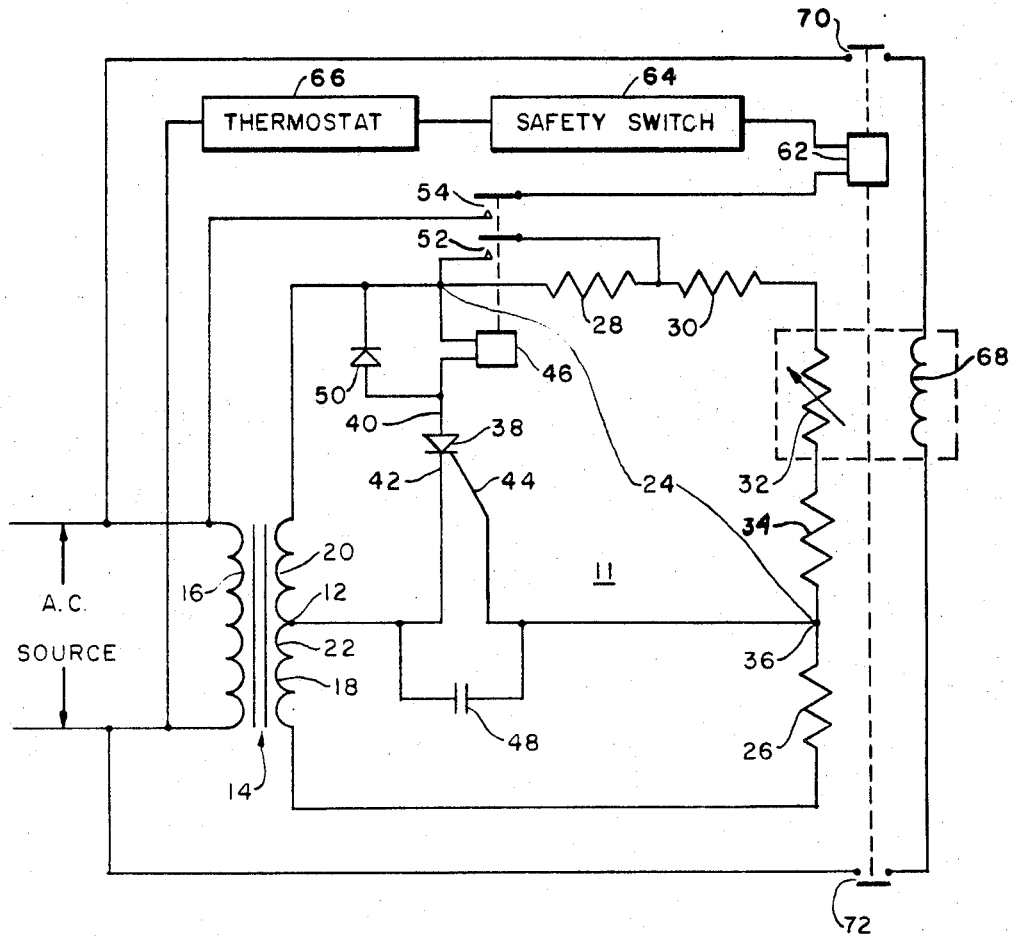
FIG. 3 is a circuit illustrating the use of the circuit shown in FIG. 1 to protect the windings of an electric motor.

FIGURE 3 shows the circuit of FIGURE 1 used to provide protection for the winding of a motor. The motor is shown connected as the compressor motor for a refrigeration system. Thus, schematic shown in FIGURE 3 therefore includes details of the load circuit 56 of FIGURE 1. Where applicable. the same reference numerals are used in FIGURE 3 to identify components which are the same as those shown and described in connection with FIGURE 1.

In the system shown the contacts 54 are connected as part of a series circuit including the winding of a magnetic starter 62, safety switch 64 and thermostat 66. This series circuit is connected to the A.C. source. The safety switch 64 may be a switch responsive to too high and too low refrigerant pressures produced by the refrigerant compressor (not shown) driven by a motor of which winding 68 is a part. The thermostat 66, of course, functions in response to the temperature to be established by the refrigerating system. The magnetic starter 62 operates two switches 70 and 72. The switches 70 and 72 are in series with the motor winding 68 and therefore control the flow of current from the A.C. supply to the motor winding 68. The temperature responsive resistance sensor 32 is embedded in the winding 68 to provide good thermal response to the temperature of the winding 68. The sensor 32 and winding 68 are enclosed by a dotted line to show this relationship.

Normally, the motor winding 68 operates at a temperature which causes the output of the bridge circuit network 10 between 36 and 12 to be above .6 v. and in phase with the voltage appearing between the anode 40 and cathode 42 of the SCR 38. This, of course, causes the SCR 38 to be placed in the "on" mode, i.e., the SCR is conducting for at least a portion of each cycle. With the SCR 38 in the "on" mode the relay 46 is energized causing the contacts 52 and 54 to be closed. Closure of contacts 52 is effective to short out the circuit modifying resistance 28 placing the first bridge circuit in operation to control the phase sensitive switch means. The first bridge circuit determines the set point temperature for the circuit. In the case of the windings for a motor used to drive a refrigerant compressor in a hermetically sealed arrangement, the set point is generally around 250° F.

Assuming that the thermostat 66 and the safety switch 64 are closed, the closure of contacts 54 is effective to cause the magnetic starter 62 to be energized closing switches 70 and 72. Closure of switches 70 and 72 connects the winding 68 to the A.C. source. Should the load on the motor cause the current through the winding 68 to increase to the point where the temperature of winding 68 reaches the set point temperature the output voltage of the bridge network 10 will drop below .6 v. causing the phase sensitive switch means comprising the SCR 38 and relay 46 to be placed in the "off" mode. Deenergization of the relay 46 causes contacts 52 and 54 to open. Opening of the contacts 54 causes the magnetic starter 62 to be deenergized allowing switches 70 and 72 to open to terminate the current flow to the motor winding 68. Opening of contacts 52 removes the shorting circuit from resistance 28 making resistance 28 an effective part of leg 24 thus placing the second bridge circuit in operation to control the phase sensitive switch means. The addition of resistance 28 to leg 24 requires the sensor 32 to drop to the reset temperature which is well below the set point temperature before the second bridge circuit provides the output needed to place the SCR 38 in the "on" mode and thus reset the circuit with the first bridge circuit connected for again detecting the set point temperature. The difference between the set point temperature and the reset point temperature is determined by the magnitude of the bridge circuitry modifying resistance 28.

Figure 4:
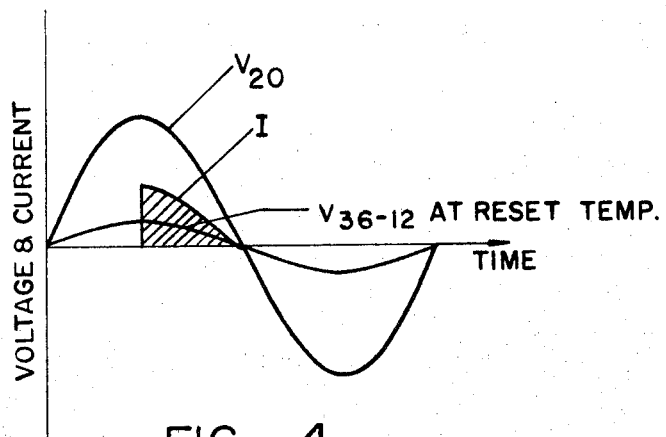
FIG. 4 is a showing of certain current and voltage relationships when the circuit of FIG. 1 is in one mode of operation.
Figure 5:
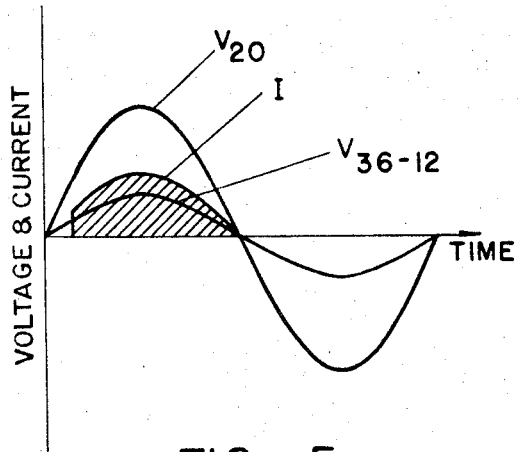
FIG. 5 is a showing of certain current and voltage relationships when the circuit of FIG. 1 is in another mode of operation.

It has been mentioned that the circuit modifying portions described in connection with resistance 28 not only provide delayed automatic reset, but improve the operation of the circuit at the most critical time, i.e., when the SCR 38 is changing its mode of operation. Thus, first consider the case where the SCR 38 is in the "off" mode. In circuits constructed without the circuit modifying portions referred to, relay chatter has been experienced when the SCR 38 and the relay 46 are placed in the "on" mode and connect a substantial load to the power source. The large load causes a momentary reduction in the supply voltage and therefore a reduction in the power delivered to the relay 46. The maximum voltage presented to the gate and cathode is just high enough to turn on the SCR 38 and is presented when the supply voltage is also at its maximum point. Under these circumstances the SCR 38 conducts for only a quarter of a cycle. The gate to cathode voltage increases only as the temperature decreases so there is no sudden increase in the gate to cathode voltage to cause the SCR 38 to conduct for a longer period of time and thus compensate for any reduction in power to the relay due to a sudden drop in the supply voltage. The voltage and current relationships existing at the time the SCR is turned on are shown in FIGURE 4. The portion under the current curve that is shaded is a measure of the power delivered to the relay 46 during each cycle with the gate to cathode voltage having a maximum amplitude which is just enough to turn on the SCR. The circuits disclosed all have arrangements in which the sensor leg 24 increases in resistance as soon as the relay contacts open in response to deenergization of the relay 46. This causes an immediate increase in the gate to cathode voltage presented to the SCR and as can be seen by the voltage and current relationships shown in FIGURE 5 causes the SCR to conduct for a greater portion of the cycle and therefore causes more power to be delivered to the relay 46.

Similarly, modification of the bridge circuit network 10 in response to the operating mode of the SCR 38 and relay 46 is of value when the SCR is placed in the "off" mode. The modification is effective to provide a step change in the bridge output in the direction needed to eliminate any possibility of rapid cycling of the SCR 38 when the bridge reaches the set point temperature. This could be a problem when the temperature to which the sensor 32 is responding is rising very slowly were it not for the circuit modification introduced as soon as the SCR 38 and relay 46 are placed in the "off" mode to deenergize the relay 46.

Thus, the circuit modification for the bridge circuit network 10 caused by the phase sensitive switch means 11 changing its mode of operation in response to the bridge output can be considered as amplifying the bridge network 10 output.

The particulars of the foregoing description are provided merely for the purpose of illustration and are subject to a considerable latitude of modification without departing from the novel teachings disclosed therein. Accordingly, the scope of the invention presented herein is intended to be limited only as defined in the appended claims, which should be accorded a breadth of interpretation consistent with this specification.

What is claimed is:

1. In a temperature responsive control circuit, the combination comprising:
   a phase sensitive switch means having an input and output, said switch means having a first and second mode of operation dependent upon the phase and magnitude of a signal applied to said input,
   an A.C. bridge network having an output signal applied to said switch means input, said network including:
      a first bridge circuit providing said network output signal in response to said first mode of operation of said switch means and
      a second bridge circuit providing said network output signal in response to said second mode of operation of said switch means,
   a temperature responsive sensor common to said first and second bridge circuits, said sensor upon sensing a first temperature when said first bridge circuit is providing said network output signal causes said network output signal to be of the proper phase and magnitude to cause said switch means to change from said first mode to said second mode and said sensor upon sensing a second temperature when said second bridge circuit is providing said network output signal causes said output signal to be of the proper phase and magnitude to cause said switch means to change from said second mode to said first mode.

2. In a temperature responsive control circuit, the combination comprising:
   a phase sensitive switch means having an input and output, said switch mean having an "on" and "off" mode of operation dependent upon the phase and magnitude of a signal applied to said input,
   an A.C. bridge network having an output signal applied to said switch means input, said network including:
      a first bridge circuit providing said network output signal in response to said "on" mode of operation of said switch means and
      a second bridge circuit providing said network output signal in response to said "off" mode of operation of said switch means,
   a temperature responsive sensor common to said first and second bridge circuits, said sensor upon sensing a first temperature when said first bridge circuit is providing said network output signal causes said output signal to be of the proper phase and magnitude to cause said switch means to change from said "on" mode to said "off" mode and said sensor upon sensing a second temperature when said second bridge is providing said network output signal causes said network output signal to be of the proper phase and magnitude to cause said switch means to change from said "off" mode to said "on" mode.

3. The temperature responsive control circuit of claim 2 wherein said second temperature is lower than said first temperature.

4. In a temperature responsive control circuit, the combination comprising:
   electronic switch means having an input and output, said switch means having one mode of operation when said input is supplied with a gating signal and having a second mode of operation when said input is not supplied with a gating signal,
   an A.C. energized bridge circuit connected to said switch means and having an output signal applied to said switch means input,
   said bridge circuit including a resistive sensor the resistance of which varies with the temperature sensed, causing the said bridge output signal to change,
   and resistive circuit modifying means connected to said bridge circuit in accordance with the mode of operation of said switch means, said circuit modifying means including a portion thereof presenting one magnitude of resistance in response to said one mode of operation of said switch means causing said bridge circuit to provide said gating signal when the temperature sensed by said sensor is less than a first temperature and presenting a different magnitude of resistance in response to said second mode of operation of said switch means causing said bridge circuit to provide said gating signal when the temperature sensed by said sensor is less than a second temperature, the difference between said first and second temperature being determined by the difference between said one magnitude of resistance and said different magnitude of resistance.

5. In a temperature responsive control circuit, the combination comprising:
   a thyristor having an input and output, said thyristor having a first and second mode of operation dependent upon the phase and magnitude of a signal applied to said input, an A.C. energized bridge circuit having an output signal applied to said thyristor input, said bridge circuit including in the arms thereof a resistive sensor the resistance of which varies with the temperature sensed, and resistive circuit modifying means connected to said bridge circuit and said thyristor output, said circuit modifying means including a portion thereof connected to the arms of said bridge circuit, said portion presenting one magnitude of resistance in response to said thyristor output when said thyristor is in said first mode of operation and presenting a different magnitude of resistance in response to said thyristor output when said thyristor is in said second mode of operation thereby requiring said sensor to respond to a first temperature when said portion presents said one magnitude of resistance to cause said bridge circuit to provide said output signal having the proper phase and magnitude to change the operation of said thyristor from said first mode to said second mode and requiring said sensor to respond to a second temperature when said portion presents said different magnitude of resistance to cause said bridge circuit to provide said output signal having the proper phase and magnitude to change the operation of said thyristor from said second mode to said first mode.

6. The temperature responsive control circuit of claim 5 wherein said thyristor is a silicon controlled rectifier.

7. The temperature responsive control circuit of claim 5 wherein said resistive sensor has a positive temperature coefficient of resistance causing its resistance to vary directly with the temperature sensed.

8. The temperature responsive control circuit of claim 5 wherein said resistive sensor and said portion of said circuit modifying means are connected in the same arm of said bridge circuit.

9. The temperature responsive control circuit of claim 5 wherein said bridge circuit includes two serially connected arms, one of which includes said sensor and the other of which includes said portion of said circuit modifying means.

10. The temperature control circuit of claim 5 wherein said first and second modes are "on" and "off" modes, respectively, and said first temperature is above said second temperature.

11. In a temperature responsive control circuit, the combination comprising:

a phase sensitive switch means having an input and output, said switch means having a first and second mode of operation dependent upon the phase and magnitude of a signal applied to said input, an A.C. energized bridge circuit including a temperature responsive resistive sensor, said bridge circuit connected to said switch means and having an output signal which is applied to said switch means input, an electric translating means connected to said switch means output and responsive to said first and second modes of operation of said switch means, a resistive circuit modifying means included in the arms of said bridge circuit and connected to said bridge circuit in response to operation of said translating means in accordance with the first and second modes of operation of said switch means, said circuit modifying means presenting one magnitude of resistance when said translating means is responding to one of said first and second modes causing said bridge circuit to provide an output signal of the proper phase and magnitude to maintain said switch means in said one mode so long as the temperature sensed by said sensor remains below a first temperature and presenting another magnitude of resistance when said translating means is responding to the other of said first and second modes causing said bridge circuit to provide an output signal of the proper phase and magnitude to maintain said switch means in said other mode so long as the temperature sensed by said sensor remains above a second temperature.

12. In a temperature responsive control circuit, the combination comprising:

a phase sensitive switch means having an input and output, said switch means having an "on" mode and an "off" mode of operation dependent upon the phase and magnitude of a signal applied to said input, an A.C. energized bridge circuit including a temperature responsive resistive sensor, said bridge circuit connected to said switch means and having an output signal which is applied to said switch means input, an electric translating means connected to said switch means output and responsive to said "on" and "off" modes of said switch means, a resistive circuit modifying means included in the arms of said bridge circuit and connected to said bridge circuit in response to operation of said translating means in accordance with the "on" and "off" modes of said switch means, said circuit modifying means presenting one magnitude of resistance when said translating means is responding to said "on" mode causing said bridge circuit to provide an output signal of the proper phase and magnitude to maintain said switch means in the "on" mode so long as the temperature sensed by said sensor remains within a first temperature range and presenting another magnitude of resistance when said translating means is responding to said "off" mode causing said bridge circuit to provide an output signal of the proper phase and magnitude to maintain said switch means in the "off" mode so long as the temperature sensed by said sensor remains within a second temperature range.

13. The temperature responsive control circuit of claim 12 wherein said first temperature range is temperatures below a first temperature and said second temperature range is temperatures above a second temperature which is below said first temperature.

14. In a temperature responsive control circuit, the combination comprising:

a phase sensitive switch means having an input and output, said switch means having a first and second mode of operation dependent upon the phase and magnitude of a signal applied to said input, said switch means including electrical contacts, said electrical contacts having a first and a second position, said electrical contacts assuming said first and second positions in response to said first and second modes of operation, respectively, of said switch means, an A.C. bridge network having an output signal which is applied to said switch means input, said network including:

a first bridge circuit connected via said first position of said electrical contacts to provide said network output signal, a second bridge circuit connected via said second position of said electrical contacts to provide said network output signal, a temperature responsive sensor common to said first and second bridge circuits, said sensor when said switch means is in said first mode of operation causes said first bridge circuit to provide an output signal for said network which is effective to maintain said switch means in said first mode so long as the temperature sensed by said sensor is within a first temperature range and when said switch means is in said second mode of operation said sensor causes said second bridge circuit to provide an output signal for said network which is effective to maintain said switch means in said second mode so long as the temperature sensed by said sensor is within a second temperature range.

15. The temperature responsive control circuit of claim 14 wherein said first and second modes of operation of said switch means are "on" and "off" modes, respectively.

16. The temperature responsive control circuit of claim 14 wherein said switch means are "on" and "off" modes, respectively, and said first temperature range is temperatures below a first temperature and said second temperature range is temperatures above a second temperature, said second temperature being below said first temperature.

17. The temperature responsive control circuit of claim 14 wherein said switch means inclues a thyristor.

18. The temperature responsive control circuit of claim 17 wherein said thyristor is a silicon controlled rectifier.

19. Apparatus for governing the energization of a winding in an electric motor in response to the temperature at said winding, the combination comprising:
- a phase sensitive switch means having an input and output, said switch means having an "on" and "off" mode of operation dependent upon the phase and magnitude of a signal applied to said input;
- control means connected to permit energization of the motor winding in response to said "on" mode of operation of said switch means and to prevent energization of the motor winding in response to said "off" mode of operation of said switch means;
- an A.C. bridge network having an output signal applied to said switch means input, said network including:
    - a first bridge circuit connected to said switch means in response to said "on" mode of operation of said switch means, and
    - a second bridge circuit connected to said switch means in response to said "off" mode of operation of said switch means,
- a temperature responsive sensor common to said first and second bridge circuits and positioned in the winding of the motor to respond to the temperature thereof, causing the output signal of said network to change in accordance with the temperature at the winding of the motor, said sensor upon sensing a first temperature when said first bridge circuit is connected to said switch means causes said network to provide an output signal of the proper phase and magnitude to cause said switch means to change from said "on" mode to said "off" mode thereby conditioning said control means to permit energization of the winding of the motor and said sensor upon sensing a second temperature when said second bridge is connected to said switch means causes said network to provide an output signal of the proper phase and magnitude to cause said switch means to change from said "off" mode to said "on" mode thereby conditioning said control means to permit energization of the winding of the motor, said second temperature being below said first temperature.

20. The apparatus of claim 19 wherein said phase sensitive switch means includes a thyristor.

21. The apparatus of claim 20 wherein said thyristor is a silicon controlled rectifier.

22. Apparatus for governing the energization of a winding in an electric motor in response to the temperature at said winding, the combination comprising:
- a phase sensitive switch means having an input and output, said switch means having an "on" and "off" mode of operation dependent upon the phase and magnitude of a signal applied to said input,
- said phase sensitive switch means including first electrical contacts having a first position and a second position and second electrical contacts having a first position and a second position, said first electrical contacts and second electrical contacts assuming their respective first and second positions in response to said "on" and "off" modes of operation, respectively, of said switch means,
- a motor winding control circuit including said first electrical contacts for controlling the flow of current to the motor winding, said control circuit conditioned by said first position of said first contacts to permit energization of the motor winding and conditioned by said second position of said first contacts to prevent energization of the motor winding,
- an A.C. bridge network having an output signal applied to said switch means input, said network including:
    - a first bridge circuit connected via said first position of said second electrical contacts to provide said network output signal,
    - a second bridge circuit connected via said second position of said second electrical contacts to provide said network output signal,
- a temperature responsive sensor common to said first and second bridge circuits and positioned in the windings of the motor to respond to the temperature thereof, said sensor when said first bridge circuit is connected to provide said network output signal causes said network output signal to be of the proper phase and magnitude to maintain said switch means in said "on" mode of operation so long as the temperature of the motor winding is below a first temperature and upon sensing said first temperature and above causes said network output signal to be of the phase and magnitude to cause said switching means to switch from said "on" mode of operation to said "off" mode of operation whereupon said second position of said second electrical contacts is established to connect said second bridge circuit to provide said network output signal and said second position of said first electrical contacts is established preventing energization of the motor winding, said sensor then causing said network output signal to be of the phase and magnitude to maintain said switch means in said "off" mode of operation until the temperature of the motor winding is below a second temperature which is below said first temperature, said sensor upon sensing said second temperature and below causes said network output signal to be of the proper phase and magnitude to cause said switching means to switch from said "off" mode of operation to said "on" mode of operation whereupon said first position of said second electrical contacts is established to again connect said first bridge circuit to provide said network output signal and said first position of said first electrical contacts is established to again condition said motor winding control circuit to permit energization of said motor winding.

23. The apparatus of claim 22 wherein said phase sensitive switch means includes a thyristor.

24. The apparatus of claim 23 wherein said thyristor is a silicon controlled rectifier.

25. Apparatus for governing the energization of a winding in an electric motor in response to the temperature at said winding, the combination comprising:
- a phase sensitive switch means having an input and output, said switch means having an "on" and "off" mode of operation dependent upon the phase and magnitude of a signal applied to said input,
- said phase sensitive switch means including an electric translating device having a first and second set of contacts, each set having open and closed positions, said contacts positioned in response to operation of said translating device in accordance with the mode of operation of said switch means,
- a motor winding control circuit including said second set of contacts connected to permit energization of the motor winding when said switch means is in said "on" mode, and to prevent energization of the motor winding when said switch means is in said "off" mode,
- an A.C. bridge network having an output signal which is applied to said switch means input, said network including:
- a first bridge circuit connected to said switch means via the positioning of said first set of contacts to provide said network output signal when said switch means is in an "on" mode of operation, and
- a second bridge circuit connected to said switch means via the positioning of said first set of contacts to provide said network output signal when said switch means is in said "off" mode of operation, a temperature responsive resistive sensor common to said first and second bridge circuits and positioned in the winding of the motor, said sensor when said first bridge circuit is connected to said switch means causes said network output signal to be of the proper phase and magnitude to cause said switch means to change from said "on" mode to said "off" mode upon sensing a first temperature whereupon said second bridge circuit is connected to said switch means and said set of contacts positioned to prevent energization of the motor winding, said sensor then causing said network output signal to be of the proper phase and magnitude to cause said switch means to change from said "off" mode to said "on" mode only after the temperature sensed has dropped to a lower second temperature whereupon said first bridge circuit is again connected to said switch means and said second set of contacts positioned to permit energization of the motor winding.

References Cited

UNITED STATES PATENTS

| | | |
|---|---|---|
| 3,136,877 | 6/1964 | Heller. |
| 3,159,768 | 12/1964 | Flanagan _____ 317—41 |
| 3,247,438 | 4/1966 | Kyle. |
| 3,268,768 | 8/1966 | Millegan et al. _____ 318—473 X |
| 3,321,641 | 5/1967 | Howell _____ 318—473 X |
| 3,329,869 | 7/1967 | Obenhaus _____ 318—473 X |

ORIS L. RADER, *Primary Examiner.*

B. A. COOPER, *Assistant Examiner.*

U.S. Cl. X.R.

317—41, 42, 13; 318—229